US007958609B2

(12) United States Patent
Gaydoul

(10) Patent No.: US 7,958,609 B2
(45) Date of Patent: Jun. 14, 2011

(54) HYDRAULIC DEVICE WHICH IS USED TO DESCALE WARM ROLLING PRODUCTS

(75) Inventor: Jurgen Gaydoul, Taby (SE)

(73) Assignee: Hermetik Hydraulik AB, Taby (SE)

( * ) Notice: Subject to any disclaimer, the term of this patent is extended or adjusted under 35 U.S.C. 154(b) by 757 days.

(21) Appl. No.: 10/590,193

(22) PCT Filed: Feb. 27, 2004

(86) PCT No.: PCT/EP2004/001968

§ 371 (c)(1), (2), (4) Date: Jun. 21, 2007

(87) PCT Pub. No.: WO2005/082555

PCT Pub. Date: Sep. 9, 2005

(65) Prior Publication Data

US 2007/0277358 A1 Dec. 6, 2007

(51) Int. Cl.

*B21B 45/04* (2006.01)
*B21C 43/00* (2006.01)
*B23K 7/00* (2006.01)

(52) U.S. Cl. .......................................... 29/81.08; 72/39

(58) Field of Classification Search ................. 29/81.01, 29/81.06, 81.08, 81.09; 134/119, 121, 172; 239/214.15, 667; 72/39

See application file for complete search history.

(56) References Cited

U.S. PATENT DOCUMENTS 2,217,360 A * 10/1940 Court .................................. 15/4
3,829,019 A * 8/1974 Petsch ........................... 239/251
3,883,075 A 5/1975 Edney et al.
5,502,881 A 4/1996 Gaydoul
5,996,200 A * 12/1999 Rosenthal et al. ........... 29/81.08

FOREIGN PATENT DOCUMENTS

DE 23 36 893 A1 1/1975
DE 43 28 303 6/1994
DE 4328303 6/1994
EP 0 586 823 A2 3/1994
JP 11-216513 8/1999

OTHER PUBLICATIONS

European Patent Office, European Opposition Department Decision, Dec. 11, 2009, p. 1-16.
International Preliminary Examination Report for PCT/EP2004/001968.

* cited by examiner

*Primary Examiner* — David P Bryant
*Assistant Examiner* — Christopher M Koehler
(74) *Attorney, Agent, or Firm* — Duane Morris LLP

(57) ABSTRACT

An apparatus for descaling hot rolled stock (17), being moved with respect to the apparatus, by spraying it with high pressure water, comprising at least one row of nozzle heads sweeping across the width of the rolled stock with a plurality of nozzle heads (20), each nozzle head being motor-driven in rotation about an axis of rotation (A) substantially perpendicular to the surface of the rolled stock and comprising at least two nozzles (1 to 8) which are disposed eccentrically with respect to the axis of rotation (A) is characterized by the nozzles (1 to 8) of each nozzle head (20) being arranged as closely as structurally possible to the circumference (25) of the nozzle head, whereby a spray pattern is created on the surface of the rolled stock in a way to at least touch the spray pattern of the adjacent nozzle head in the row of nozzle heads.

18 Claims, 3 Drawing Sheets

HYDRAULIC DEVICE WHICH IS USED TO DESCALE WARM ROLLING PRODUCTS

The invention relates to an apparatus for descaling hot rolled stock, being moved with respect to the apparatus, by spraying it with high pressure water, comprising at least one row of nozzle heads sweeping across the width of the rolled stock with a plurality of nozzle heads, each nozzle head being motor-driven in rotation about an axis of rotation substantially perpendicular to the surface of the rolled stock and comprising at least two nozzles which are disposed eccentrically with respect to the axis of rotation.

For uniform treatment of the rolled stock surface by means of an apparatus of this kind known from DE 43 28 303 the nozzles in each nozzle head are disposed at different angles with respect to the axis of rotation so that the spray pattern of each nozzle with reference to the axis of rotation of the nozzle head covers a different radial area. Hereby it is intended that the rolled stock surface subjected to treatment by a nozzle head be descaled uniformly throughout the full radius of the nozzle head.

DE 43 28 303 is silent as to how such uniform descaling is to be achieved in the direction of the width of the rolled stock surface. To obtain uniform spraying intensity, the distance between the nozzles and the rolled stock to be sprayed on as well as the angle of inclination of the nozzles with respect to the line perpendicular to the surface of the rolled stock and also the jet opening angle of the spray cone must be kept as small as possible. On the other hand, a respective minimum spacing must be observed between adjacent nozzle heads of the row of nozzle heads in width direction of the rolled stock. Therefore, when a nozzle head row is positioned transversely of the direction of movement of the rolled stock, it is possible for stripes to remain on the surface between adjacent nozzle heads where insufficient or no descaling was achieved.

It is an object of the invention to overcome such shortcoming by providing a descaling apparatus of the kind specified initially which permits uniform descaling of rolled stock across the entire width thereof.

The features defined in claim 1 serve to meet that object.

With the invention, the arrangement and inclination of the nozzles of each nozzle head are designed in response both to the distance of the nozzle heads from the rolled stock surface and the spacing between adjacent nozzle heads such that each nozzle head creates a spray pattern on the surface of the rolled stock which pattern at least will touch, or better still overlap, the spray pattern of the adjacent nozzle head or heads in the row of nozzle heads. Thus it is warranted that, when directing jets onto the surface of rolled stock, no surface stripes will result where no descaling or only insufficient descaling took place.

In a preferred embodiment of the apparatus according to the invention the nozzles of each nozzle head are inclined radially outwardly.

In an especially preferred embodiment the nozzles additionally are inclined in circumferential direction in the sense of rotation, i.e. so as to be leading with respect to the rotary movement of the nozzle head.

When the nozzle heads of a row of nozzle heads are driven in the same direction this will result in the nozzle jets rotating past each other in mirror image opposite directions in the zone of the gap between two nozzle heads. That may have the undesirable consequence of the nozzle jets mutually influencing each other, thus causing turbulences which are detrimental to the desired uniform descaling. For this reason, it is another object of the invention to overcome that. To this end it is provided that, in an apparatus of the kind specified initially, adjacent nozzle heads in the row of nozzle heads are adapted to be driven so as to rotate in opposite sense. This concept is important both in combination with the features of claim 1 and also with the features of the preamble alone of claim 1.

Further advantageous modifications of the invention are indicated in the other subclaims, e.g. preferred angular ranges of the radial inclination of the nozzles and of the inclination of the nozzles in circumferential direction, as well as preferred numbers of nozzles distributed evenly around the circumference of each nozzle head.

The invention will be described in greater detail below with reference to diagrammatic drawings, in which.

Figure 1:
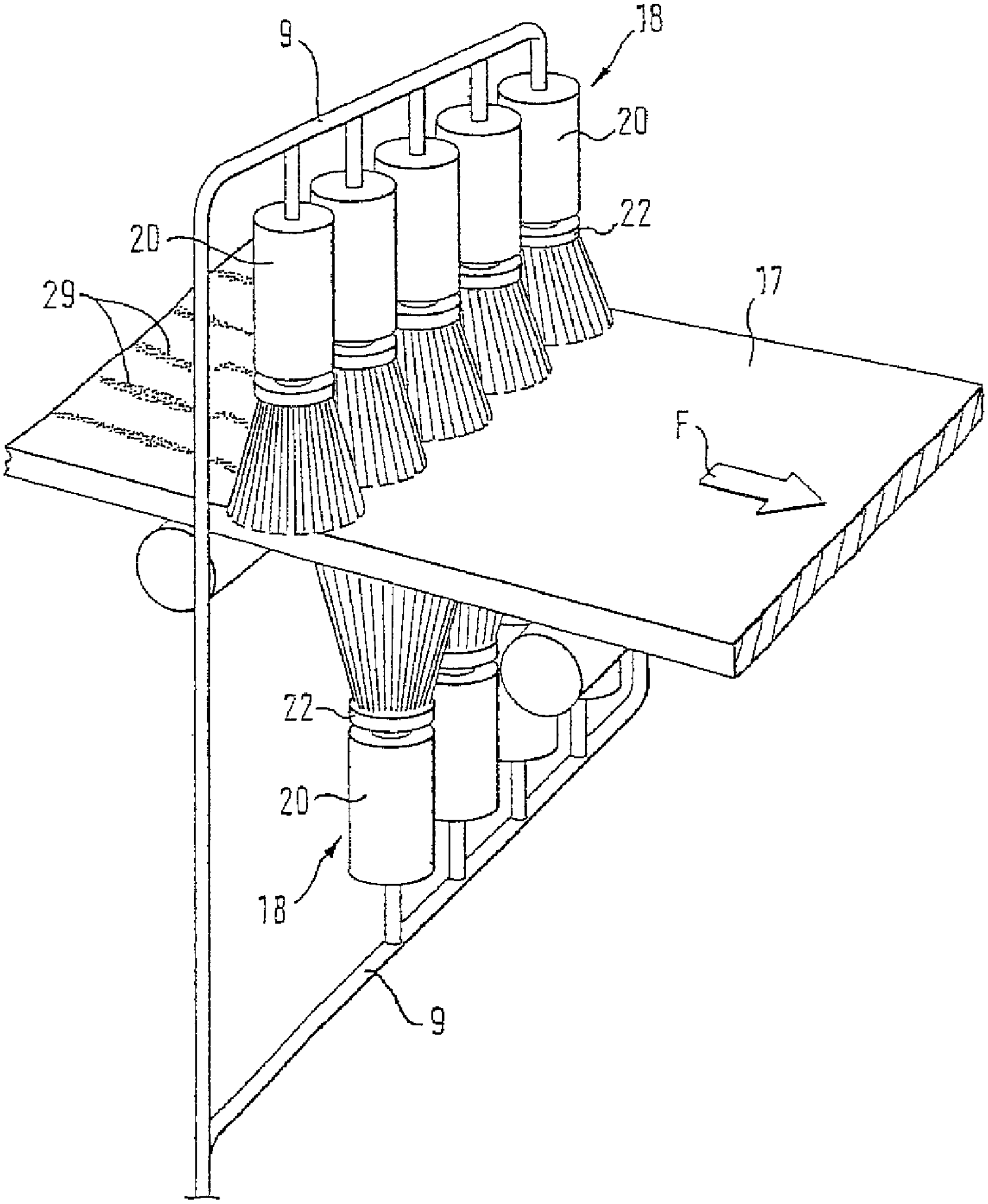
Fig. 1 Prior Art
FIG. 1 is a diagrammatic perspective view of a known apparatus.

The apparatus for descaling rolled stock 17 shown in FIG. 1 comprises two rows 18, each including five stationary nozzle heads 20 and extending transversely of the direction of movement F of the rolled stock 17, at either side thereof. One of those nozzle heads is shown in detail in FIG. 2. At its circumference, each nozzle head 20 is provided with four flat-section jet nozzles 21 distributed around the circumference and mounted on a ring 22 of the nozzle head 20 which ring is adapted to be driven in rotation. The nozzles are supplied through conduits 9 with pressurized water at a pressure of from 300 to 1000 bar.

The ring 22 is driven at a number of revolutions of from 200 to 1000 r.p.m.

Figure 3:
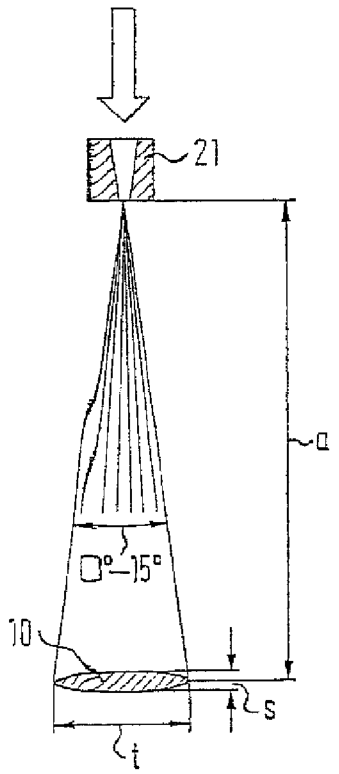
Fig. 3 Prior Art
FIG. 3 shows a known nozzle and a spray pattern produced by the same.

The nozzle heads 20 are arranged with a distance a of the nozzles 21 from the surface of the rolled stock which is moving in the direction of arrow F under the stationary row of nozzle heads. This distance is selected so that the length t of the great major axis and the length s of the small major axis of the elliptical spray pattern of each nozzle 21, as shown in FIG. 3, correspond to desired values. The opening angle of the flat-section jet lies between 0° and 15°.

Figure 2:
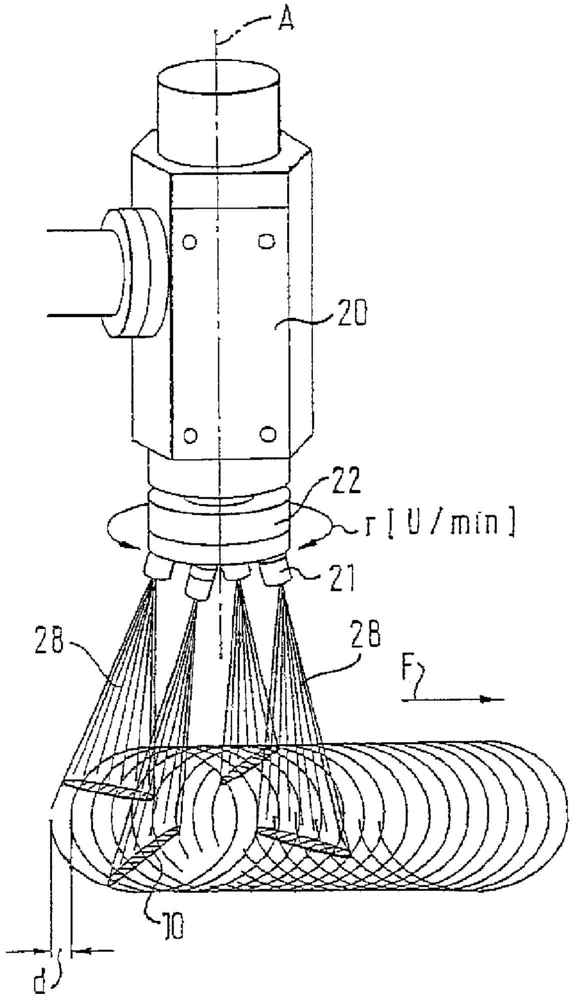
Fig. 2 Prior Art
FIG. 2 shows a nozzle head of the known apparatus and a spray pattern produced by the nozzles thereof.

The ellipse 10, pressed flat in the spray pattern shown in FIG. 2, rotates about the vertical axis of rotation A of the nozzle head 20 due to the rotation of the nozzles 21 while the rolled stock 17, at the same time, is advanced in the direction of arrow F under the nozzle heads 20. At a rotational speed of 1000 r.p.m. and a travelling speed v of 0.8 m/sec of the rolled stock with respect to the stationary nozzle heads 20, the rolled stock advances by distance d with each revolution of the nozzle head 20. This distance d corresponds to one fourth to one fifth of the radius of the nozzle head. In this manner an overall spiral shaped spray pattern is obtained, as illustrated in FIG. 2.

If the spray cones 28 of adjacent nozzle heads 20 do not touch or overlap each other sufficiently in the zones between the nozzle heads it may happen that surface stripes 29 remain on the surface of the rolled stock where descaling did not take place or not sufficiently so. This stands in the way of achieving the desired uniform surface quality of the rolled stock across the entire width thereof.

Figure 5:
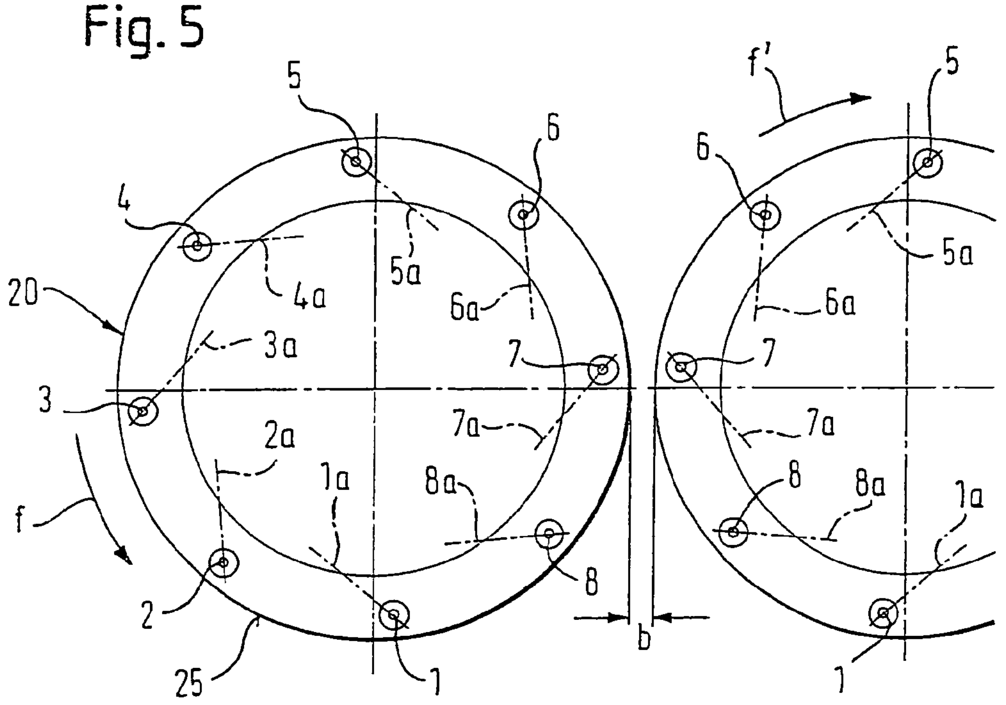
FIG. 5 is a view of the two nozzle heads as seen in the direction of arrow V in FIG. 4.
Figure 4:
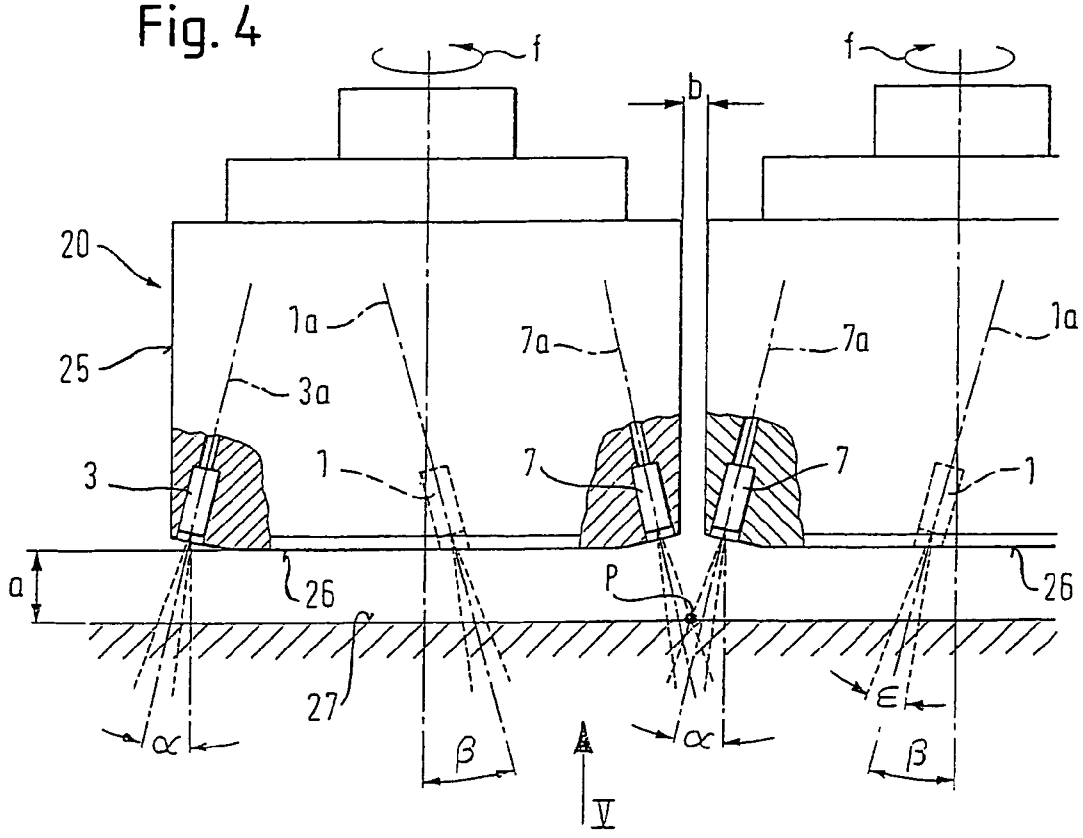
FIG. 4 is a diagrammatic illustration of two nozzle heads according to the invention arranged side by side in a row of nozzle heads above the rolled stock.

FIGS. 4 and 5 are diagrammatic presentations of two adjacent nozzle heads of a row of nozzle heads in accordance with the invention. Each nozzle head comprises a total of eight nozzles 1 to 8 uniformly distributed around the circumference. The openings of the nozzles at the bottom of the nozzle head 20 are arranged radially as far as possible towards the outside, in other words as closely as structurally possible to the outermost circumference 25 of each nozzle head. The eight nozzles 1 to 8 are aligned along nozzle axes 1*a* to 8*a*.

As may be taken from FIG. 4, these nozzle axes 1*a* to 8*a* are inclined radially outwardly at an angle $\alpha$ and, furthermore, are inclined at an angle $\beta$ in circumferential direction in the sense of rotation, i.e. so as to be leading in the direction of rotation f or f' of the nozzle heads. This results in an overall inclination of each nozzle both in radial and circumferential directions by angles $\alpha$ and $\beta$. The angle $\alpha$ lies in the range between 0° and 20°, preferably in the range of $\alpha$=12°±2°.

The angle $\beta$ lies in the range between 0° and 30°, preferably in the range between $\beta$=15°±2°.

FIG. 4 also shows that, with a distance a between the bottom 26 of the nozzle heads 20 and the surface 27 to be descaled of the rolled stock, the outer generated surfaces of the spray cones, indicated in discontinuous lines in FIG. 4, just barely touch each other at point P of nozzles 7, 7 in the gap b between the two adjacent nozzle heads, in other words at the minimum spacing between them. Thus the full width of the rolled stock surface is covered by the nozzle jets, and no stripes 29 (FIG. 1) are left where the surface has not been descaled or only insufficiently so.

A desired overlap of the nozzle jets exiting from the nozzles 7, to make sure the formation of stripes described above is totally eliminated, readily could be achieved by reducing the distance a and/or increasing the radial angle of inclination $\alpha$ and/or increasing the jet opening angle $\epsilon$.

In the embodiment shown, adjacent nozzle heads 20 rotate in opposite directions. This means that in the gap b between two adjacent nozzle heads 20 the jets exiting from the nozzles thereof each are sprayed in mirror image in the same direction. For example, nozzles 7, 7 in FIG. 5 spray in mirror image obliquely upwardly. This is advantageous with a view to achieving a uniform surface quality. Moreover, the torques of adjacent nozzle heads are compensated by the fact that the nozzle heads are driven in pairs in opposite directions.

The number of rows of nozzle heads may be even or uneven. The number will be greater or smaller, depending on the width of the rolled stock to be descaled. Where rolled stock of different widths must be descaled in a rolling mill installation, it is advantageous to have the nozzle heads 20 designed for switch-off and on in pairs or groups.

The features disclosed in the specification above, in the figures and claims may be significant for implementing the invention in its various modifications, both individually and in any combination.

The invention claimed is:

1. An apparatus for descaling hot rolled stock, being moved with respect to the apparatus, by spraying it with high pressure water, comprising at least one row of nozzle heads sweeping across the width of the rolled stock with a plurality of nozzle heads, each nozzle head being motor-driven in rotation about an axis of rotation (A) substantially perpendicular to the surface of the rolled stock and comprising at least two nozzles which are disposed eccentrically with respect to the axis of rotation (A), the nozzles of each nozzle head being arranged as closely as structurally possible to the circumference of the nozzle head, whereby a spray pattern is created on the surface of the rolled stock in a way to touch or overlap the spray pattern of the adjacent nozzle head in the row of nozzle heads, and all of the nozzles having a substantially uniform spray and being arranged in the nozzle head radially inclined outwardly at an angle of inclination ($\alpha$) in the range of $0° \leqq \alpha \leqq 20°$, and inclined in circumferential direction (f,f') in the forward direction of the rotation of the nozzle head.

2. The apparatus of claim 1, wherein the angle ($\alpha$) of radial inclination is in the range of $\alpha \approx 12° \pm 2°$.

3. The apparatus of claim 1, wherein the angle of inclination ($\beta$) of the nozzles in circumferential direction lies in an angular range of $0° < \beta \leqq 30°$.

4. The apparatus of claim 3 wherein the angle of inclination ($\beta$) of the nozzles in the circumferential direction lies in an angular range of $\beta \approx 15° \pm 2°$.

5. The apparatus of claim 1, wherein adjacent nozzle heads in the row of nozzle heads are driven to rotate in opposite directions with respect to one another.

6. The apparatus of claim 1, wherein the jet opening angle ($\epsilon$) of the jet exiting from the nozzles is no greater than 15°.

7. The apparatus of claim 6 wherein the jet opening angle ($\epsilon$) of the jet exiting from the nozzles is no greater than 10°.

8. The apparatus of claim 1, wherein at least six nozzles are arranged evenly distributed around the circumference of each nozzle head.

9. The apparatus of claim 8, wherein eight nozzles are arranged evenly distributed around the circumference of each nozzle head.

10. An apparatus for descaling hot rolled stock, being moved with respect to the apparatus, by spraying it with high pressure water, comprising at least one row of nozzle heads sweeping across the width of the rolled stock with a plurality of nozzle heads, each nozzle head being motor-driven in rotation about an axis of rotation (A) substantially perpendicular to the surface of the rolled stock and comprising at least two nozzles which are disposed eccentrically with respect to the axis of rotation (A), the nozzles of each nozzle head being arranged as closely as structurally possible to the circumference of the nozzle head, whereby a spray pattern is created on the surface of the rolled stock in a way to touch or overlap the spray pattern of the adjacent nozzle head in the row of nozzle heads, and all of the nozzles having a substantially uniform spray and being arranged in the nozzle head radially inclined outwardly at an angle of inclination ($\alpha$) in the range of $0° \leqq \alpha \leqq 20°$, and inclined in circumferential direction (f,f') in the forward direction of the rotation of the nozzle head wherein pairs or groups of nozzle heads in the row of nozzle heads are adapted to be switched off or on in correspondence with different widths of rolled stock.

11. The apparatus of claim 10, wherein the angle ($\alpha$) of radial inclination is in the range of $\alpha \approx 12° \pm 2°$.

12. The apparatus of claim 10, wherein the angle of inclination ($\beta$) of the nozzles in circumferential direction lies in an angular range of $0° < \beta \leqq 30°$.

13. The apparatus of claim 12 wherein the angle of inclination ($\beta$) of the nozzles in the circumferential direction lies in an angular range of $\beta \approx 15° \pm 2°$.

14. The apparatus of claim 10, wherein adjacent nozzle heads in the row of nozzle heads are driven in to rotate in opposite directions with respect to one another.

15. The apparatus of claim 10, wherein the jet opening angle ($\epsilon$) of the jet exiting from the nozzles is no greater than 15°.

16. The apparatus of claim 15 wherein the jet opening angle ($\epsilon$) of the jet exiting from the nozzles is no greater than 10°.

17. The apparatus of claim 10, wherein at least six nozzles are arranged evenly distributed around the circumference of each nozzle head.

18. The apparatus of claim 17, wherein eight nozzles are arranged evenly distributed around the circumference of each nozzle head.

* * * * *